United States Patent [19]

Christopher et al.

[11] Patent Number: 4,848,384

[45] Date of Patent: Jul. 18, 1989

[54] MOTOR VEHICLE WASHING SYSTEM WITH AUTOMATIC SEQUENCING OF DIFFERENT CLEANING LIQUIDS

[75] Inventors: S. Craig Christopher, Little Rock; Donel R. Whiting, Alexander, both of Ark.

[73] Assignee: Staley Electric Company, Little Rock, Ark.

[21] Appl. No.: 302,963

[22] Filed: Jan. 30, 1989

[51] Int. Cl.[4] ............................................. B08B 3/02
[52] U.S. Cl. .................................... 134/57 R; 134/95; 134/98; 134/100; 134/174; 134/123
[58] Field of Search .................... 134/45, 56 R, 58 R, 134/94, 95, 98, 172, 174, 198, 123, 100, 57 R

[56] References Cited

U.S. PATENT DOCUMENTS

| | | |
|---|---|---|
| 2,506,394 | 5/1950 | Strange . |
| 2,740,415 | 4/1956 | Federighi .................. 134/100 X |
| 3,007,609 | 11/1961 | Pascucci . |
| 3,021,863 | 2/1962 | Low . |
| 3,049,266 | 8/1962 | Werry . |
| 3,049,302 | 8/1962 | Simmons, Jr. ............. 134/57 R X |
| 3,081,947 | 3/1963 | Walter ....................... 134/57 R |
| 3,103,312 | 9/1963 | Damrow . |
| 3,139,238 | 6/1964 | Norstrud et al. . |
| 3,163,880 | 1/1965 | Johnson . |
| 3,167,091 | 1/1965 | Holdren . |
| 3,229,703 | 1/1966 | Thompson et al. ................ 134/100 |
| 3,245,585 | 4/1966 | Dawson . |
| 3,289,942 | 6/1960 | Heinicke et al. . |
| 3,318,535 | 5/1967 | New . |
| 3,322,350 | 5/1967 | Heinicke et al. . |
| 3,361,300 | 1/1968 | Kaplan . |
| 3,369,705 | 2/1968 | Curtis et al. . |
| 3,369,755 | 2/1968 | Roden et al. . |
| 3,383,044 | 5/1968 | Norstrud et al. ............. 239/414 X |
| 3,392,752 | 7/1968 | Iozzi et al. . |
| 3,443,270 | 5/1969 | Smith . |
| 3,447,505 | 6/1969 | Wagner . |
| 3,454,030 | 7/1969 | Nelson . |
| 3,454,042 | 7/1969 | Phillips ..................... 134/100 X |
| 3,459,334 | 8/1969 | Evans . |
| 3,481,544 | 2/1969 | Jackson . |
| 3,482,740 | 12/1969 | Evans et al. . |
| 3,545,459 | 12/1970 | Phillips . |
| 3,567,342 | 3/1971 | Jackson . |
| 3,575,348 | 4/1971 | MacKay . |
| 3,664,550 | 5/1972 | Carothers et al. . |
| 3,667,486 | 6/1972 | Cole et al. . |
| 3,674,205 | 7/1972 | Kock . |
| 3,687,156 | 8/1972 | Minich, Jr. et al. . |
| 3,703,187 | 11/1972 | Booth . |
| 3,760,982 | 9/1973 | Haase . |
| 3,810,787 | 5/1974 | Yoeli et al. ..................... 134/100 X |
| 3,829,024 | 8/1974 | Heden ............................. 134/100 X |
| 3,850,371 | 11/1974 | Trapp . |
| 3,989,390 | 11/1976 | Thorner . |
| 3,989,391 | 11/1976 | Throner . |
| 4,123,004 | 10/1978 | Jerry . |
| 4,290,442 | 9/1981 | Shaffer ....................... 137/624.18 X |
| 4,306,678 | 12/1981 | Schull . |
| 4,335,481 | 6/1982 | Slayman . |
| 4,413,785 | 11/1983 | Engelbert et al. . |
| 4,541,568 | 9/1985 | Lichfield . |
| 4,552,476 | 11/1985 | Heraty et al. . |

*Primary Examiner*—Frankie L. Stinson
*Attorney, Agent, or Firm*—Nixon & Vanderhye, P.C.

[57] ABSTRACT

A liquid application system particularly adapted to being employed in motor vehicle washing is disclosed. The system includes a manually actuable liquid applicator and a supply subsystem which supplies liquid under pressure to the applicator from several discrete liquid sources. Sequencing control so as to achieve a supply of liquid from one and then another of the sources is achieved by sensing a pressure condition within the liquid supply, such as, an increased pressure which occurs within the liquid supply system when the applicator is changed from its operable mode to its inoperable mode. Valving control is then achieved so that fluid communication is cyclically established between the one and another liquid sources in response to a cyclical change of operation of the applicator between its operable and inoperable modes. In such a manner, by merely changing the applicator between its operable and inoperable modes, one can effectively select a particular liquid supplied to the applicator.

14 Claims, 4 Drawing Sheets

MOTOR VEHICLE WASHING SYSTEM WITH AUTOMATIC SEQUENCING OF DIFFERENT CLEANING LIQUIDS

FIELD OF THE INVENTION

This invention broadly relates to the field of liquid application systems of the type wherein a pressurized liquid is supplied to an applicator and is expelled from the applicator onto a desired area of liquid application. The invention is preferably embodied in a motor vehicle washing system which is capable of being automatically sequenced between several discrete liquids (or liquid mixtures). The invention achieves such sequencing by sensing a predetermined pressure condition existing in the liquid line upstream of the applicator and then switching automatically from one liquid source to another in response to such sensed pressure condition.

BACKGROUND AND SUMMARY OF THE INVENTION

The use of high pressure liquid applicator systems are generally known and have several uses. One such use is in the field of motor vehicle wash stations, particularly those of the self-serve variety. In these systems, a manually operated liquid applicator (usually called a "wand") is supplied with a stream of high pressure water (generated by means of a pump) so that the water is directed towards the motor vehicle by the user.

As may be appreciated, the washing of a motor vehicle usually involves several sequences. For example, the motor vehicle may first be rinsed with water discharged from the wand so as to provide a preliminary loosening of dirt and grime. This preliminary rinse sequence may then be followed by a wash sequence where a liquid detergent is supplied to the water and this high pressure liquid mixture of liquid detergent and water may then be directed towards the motor vehicle. Finally, any detergent residue which remains may then be removed by again directing a high pressure rinse water stream against the motor vehicle. It is also sometimes desirable to apply other chemical additives to the water stream at different sequences in the wash cycle. For example, a liquid wax or other surface protective medium may be injected into the water stream and thus applied onto the motor vehicle via the wand.

In the past, a user's selection of particular ones of these various liquid streams usually depended upon a manually actuated fluid switch which the user manipulated each time it was desired to change from one type of liquid stream (i.e. one which may or may not contain a chemical additive) to another. These fluid switches have typically been located within the motor vehicle wash bay or as a part of the wand itself (see, Trapp U.S. Pat. No. 3,850,371 ). These prior systems thus require that the user support the wand with one hand while attempting to manipulate the fluid switch with the other hand—an awkward exercise. And, since the wand itself may be somewhat cumbersome, it is usually insufficiently supported by the user during his/her switching from one liquid supply to another. This, in turn, may contribute to user fatigue.

In U.S. Pat. No. 4,290,442, a cleaning system is proposed whereby each initiation of flow from a source of water is sensed. An electrical signal is issued in response to each such flow initiaion. This electrical signal is then applied to a switching system which switches between one and another electrically-operated valves in response to receipt of each such electrical signal. In such a manner, sequencing of liquid from different sources is apparently possible.

Another system has been proposed in Norstrud U.S. Pat. No. 3,383,044 et al. According to this prior proposal, a hydraulically controlled pressure washer includes a pressure sensor so as to sense predetermined pressure conditions existing within a common supply line fluid-connected to a pressure wand. The pressure sensor activates one of a plurality of switches so as to select the injection of cleaning agents from either, or all, of such sources.

While the above-noted prior proposals may provide some benefit over strictly manual switching systems in terms of minimizing user fatigue and facilitating quicker selection between a number of liquid sources desired to be dispensed through the wand, some improvements are still required. For example, it would be desireable (in terms of liquid switching responsivenes) if a control scheme could be provided whereby each successive liquid to be dispensed would be in a "stand-by" mode while the previous liquid in the sequence is being dispensed. And, it would also be desireable if this stand-by condition became an active condition (i.e., so as to extablish fluid communication between the next successive liquid in the sequence and the wand) during a "no flow" condition through the wand. In this way, the lead time necessary for the next successive liquid to be discharged from the wand could possibly be minimized.

These objects are achieved according to the present invention by means which sense a predetermined pressure condition which occurs within the liquid supply line to the wand. This pressure condition is preferably indicative of a user's manual opening and closing of the wand. That is, means are provided in accordance with this invention for sensing the cyclical opening and closing of the wand by a user—which opening and closing respectively decreases and increases pressure conditions existing in the liquid supply line. In response to at least one of these sensed pressure conditions, valving structures are operated so as to open fluid communication between at least one liquid source and the wand and to close fluid communication between another liquid source and the wand. When the pressure condition is again sensed the fluid communication between the one and other sources and the wand is reversed—that is, fluid communication between the wand and the first source is closed and fluid communication between the wand and the other fluid source is opened.

As may be appreciated, any number of fluid sources containing (or adapted to be supplied with) the same or different liquids may be provided according to this invention and the supply of any particular liquid (or combination of liquids) may be selected by a user merely by changing the wand between its operable and inoperable modes (for example, as by merely cyclically squeezing and releasing the trigger of the wand).

Other advantages and aspects of this invention will become clear from the following detailed description of the preferred exemplary embodiment.

BRIEF DESCRIPTION OF THE PREFERRED EMBODIMENT

Reference will hereinafter be made to the accompanying drawings wherein like numerals throughout the various FIGURES denote like structural elements, and wherein.

DETAILED DESCRIPTION OF THE PREFERRED EXEMPLARY EMBODIMENT

Figure 1:
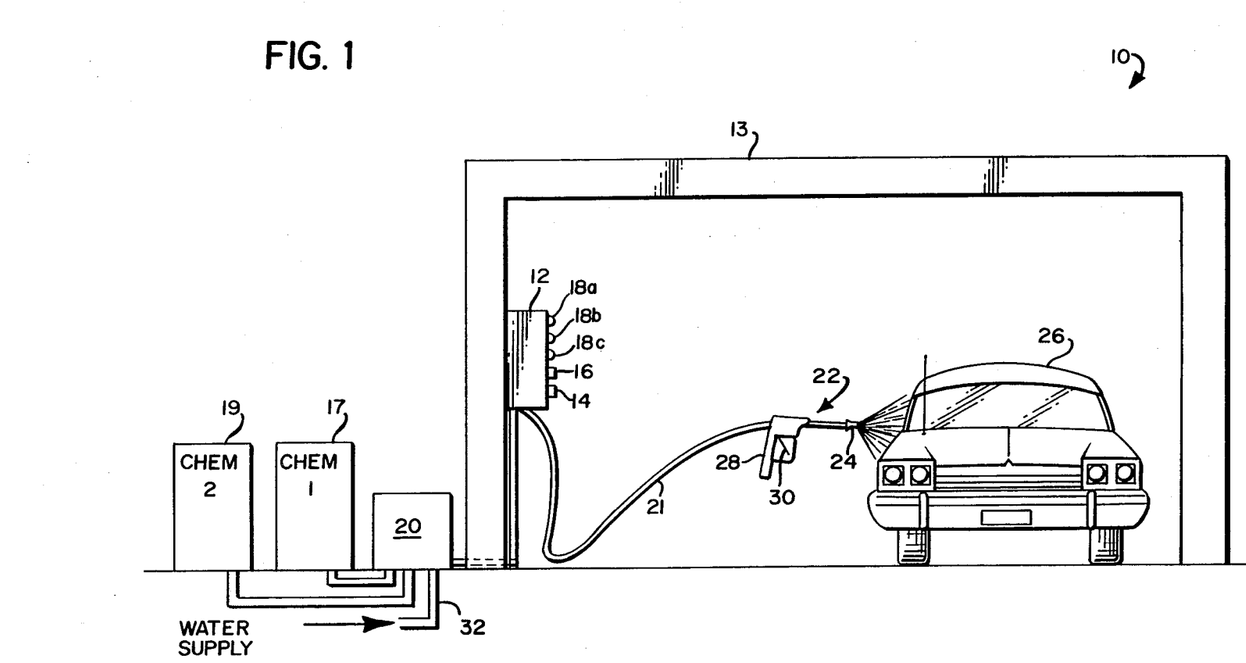
FIG. 1 is a schematic elevational view of a motor vehicle washing system in accordance with this invention.

FIG. 1 schematically shows, in elevational view, a motor vehicle washing system 10 according to the present invention. System 10 includes a control panel 12 within a vehicle wash bay 13. The control panel 12 has user operable control switch 14 (which controls the starting and stopping of the system 10) and a mode switch 16 (which permits the user to select the particular mode for the wash system 10) in addition to indicator lights 18a-18c (which provide the user with a visual indication of the particular mode of operation for the system 10).

As will be discussed in greater detail below, liquid from several sources (for example, "CHEM 1" and "CHEM 2" sources 17 and 19, respectively) is supplied to pump station 20, and then via hose 21 to spray wand 22. The liquid is then discharged from the nozzle tip 24 for application onto a vehicle 26. The spray wand 22 may be of any conventional type having operable and inoperable modes. Thus wand 22 may generally be comprised of a handle 28 and a trigger 30 which is manually depressed by a user so as to allow liquid to flow through the nozzle 24 when desired, and is released when the flow of liquid is to be stopped.

The liquid sources are schematically shown in FIG. 1 as being water (for example, from a city's potable water supply via line 32) and/or from other holding tanks, vessels or the like designated by reference numerals 17 and 19 in FIG. 1. Thus, container 17 may provide a source of liquid detergent, for example, which is mixed in station 20 (as will be discussed below) and applied via wand 22 to the motor vehicle 26 thereby washing the same. Tank 19, on the other hand, may contain a liquid wax (or other surface-protective medium) which may be mixed with the water supply and applied via wand 22 to the vehicle 26 at the appropriate cycle in the wash.

Figure 2:
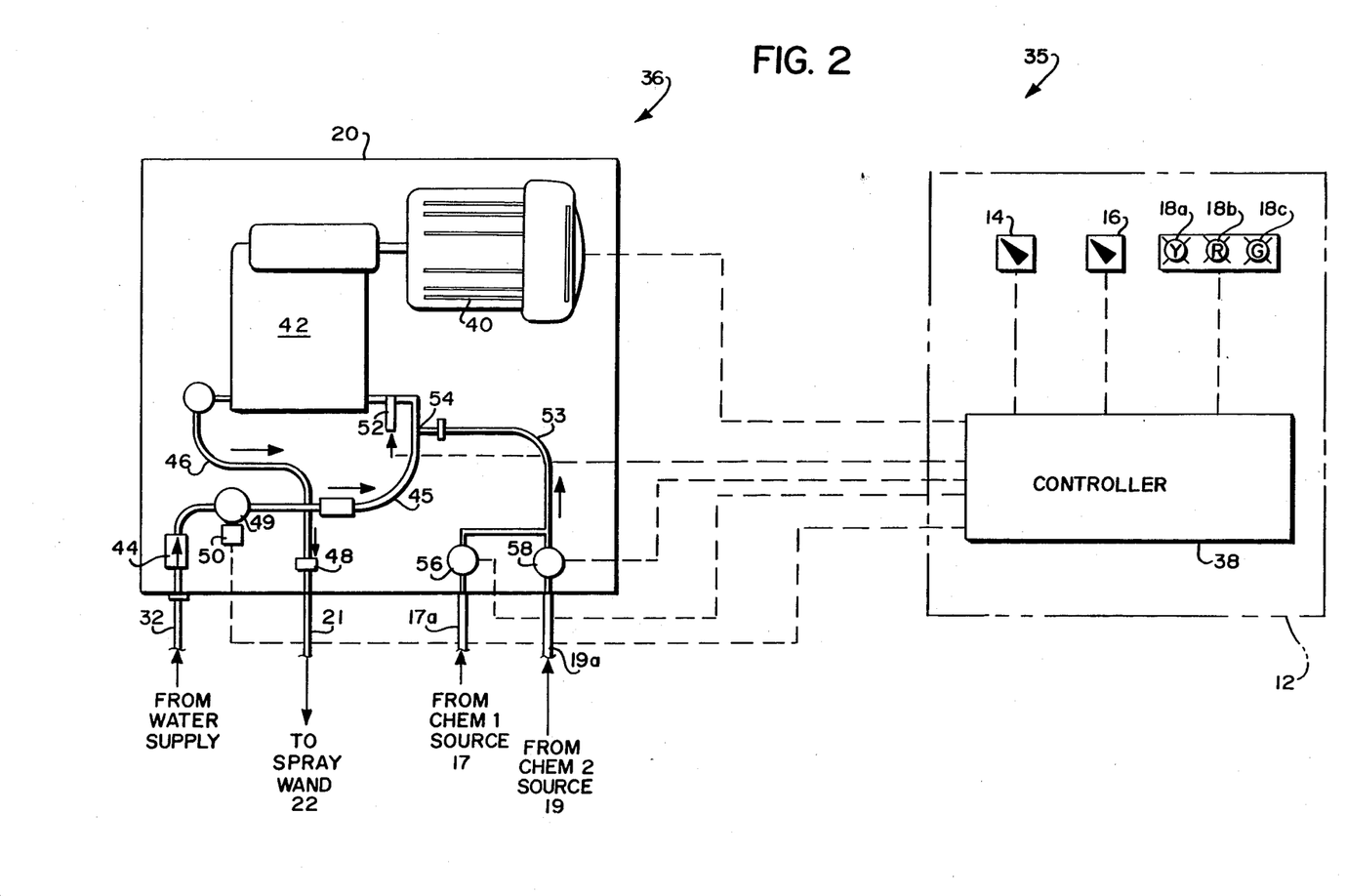
FIG. 2 is a schematic view of the fluid supply circuitry employed in the motor vehicle washing system of FIG. 1.

The fluid control system 35 is shown in accompanying FIG. 2. Generally, the fluid control system 35 includes a fluid circuit control subsystem 36 (preferably housed within pump station 20) and an electronic controller 38 (preferably housed within panel 12). Switches 14, 16 and indicator lights 18a-18c are in electrical communication with controller 38 and, as will be described in greater detail below, a variety of functions in the fluid circuit 36 are controlled/monitored via controller 38.

An electric motor 40 drives a high-pressure, positive displacement pump 42 so as to pump water from the water supply, through a solenoid operated shut-off valve 44 in the low pressure inlet line 45, and then to high-pressure discharge line 46. Line 46 is coupled at coupling 48 to hose 21 so that high-pressure liquid may be supplied to spray wand 22. A pressure sensing valve 49 and temperature probe 52 are also provided in the inlet line 45.

The pressure sensing valve 49 can be of any suitable type which operates in response to greater/lesser pressure conditions existing within the line 45 (i.e., in dependence upon a user manually operating the wand 22 between its inoperable/operable modes, respectively). One preferred pressure sensing valve 49 is commercially available from Fluid Control Corporation, Tulsa, Okla., Model No. PR-1000A. This preferred valve is a balanced diaphragm-type valve which moves in response to greater/lesser pressure conditions existing within the line 45.

According to the present invention, valve 49 is modified so as to include, in the embodiments described below, a conventional "push-on/push-off" single-pole double-throw (SPDT) type microswitch 50. The microswitch 50 is preferably mounted to the diaphragm housing of valve 49 and thus changes state (i.e., switches between its "normally open" and "normally closed" contacts) in response to movements of the diaphragm. That is, the actuator of microswitch 50 is positioned with respect to the diaphragm of valve 49 such that the microswitch moves in response to movement of the diaphragm, thereby effecting changes in state of the microswitch 50.

Chemical injection of a liquid from source 17 or source 19 is accomplished at junction 54. Solenoid valves 56, 58 are respectively provided in the lines 17a, 19a which fluid communicate the sources 17, 19, respectively, with junction 54 via line 53. Thus, the liquid from sources 17 and/or 19 flows to the junction 54 and may be injected into the water stream within line 45 so that it is discharged via the pump 42, through line 46, and then on to spray wand 22.

Important to the present invention is the selective sequencing of liquids as between the water supply only (i.e., a "rinse" cycle). The liquid injection from source 17 and source 19 will be described now with reference to FIG. 3, which shows one embodiment of electronic controller 38 and associated operative components in their de-energized or "off" state. In order to begin the washing cycle, a user will manually move the control switch 14 to an "on" position. This causes contacts 14a, 14b to close thereby activating the water supply solenoid valve 44 to permit water to be supplied via line 45 to the pump 42. It should also be noted that while in the "on" position, power is supplied across contacts 14a, 14b to contact 14c to the mode switch 16 across contacts 16a, 16b (i.e., since mode switch 16 is shown in the initial "rinse" mode) thereby illuminating the yellow (or "rinse mode") indicator light 18a.

Figure 3:
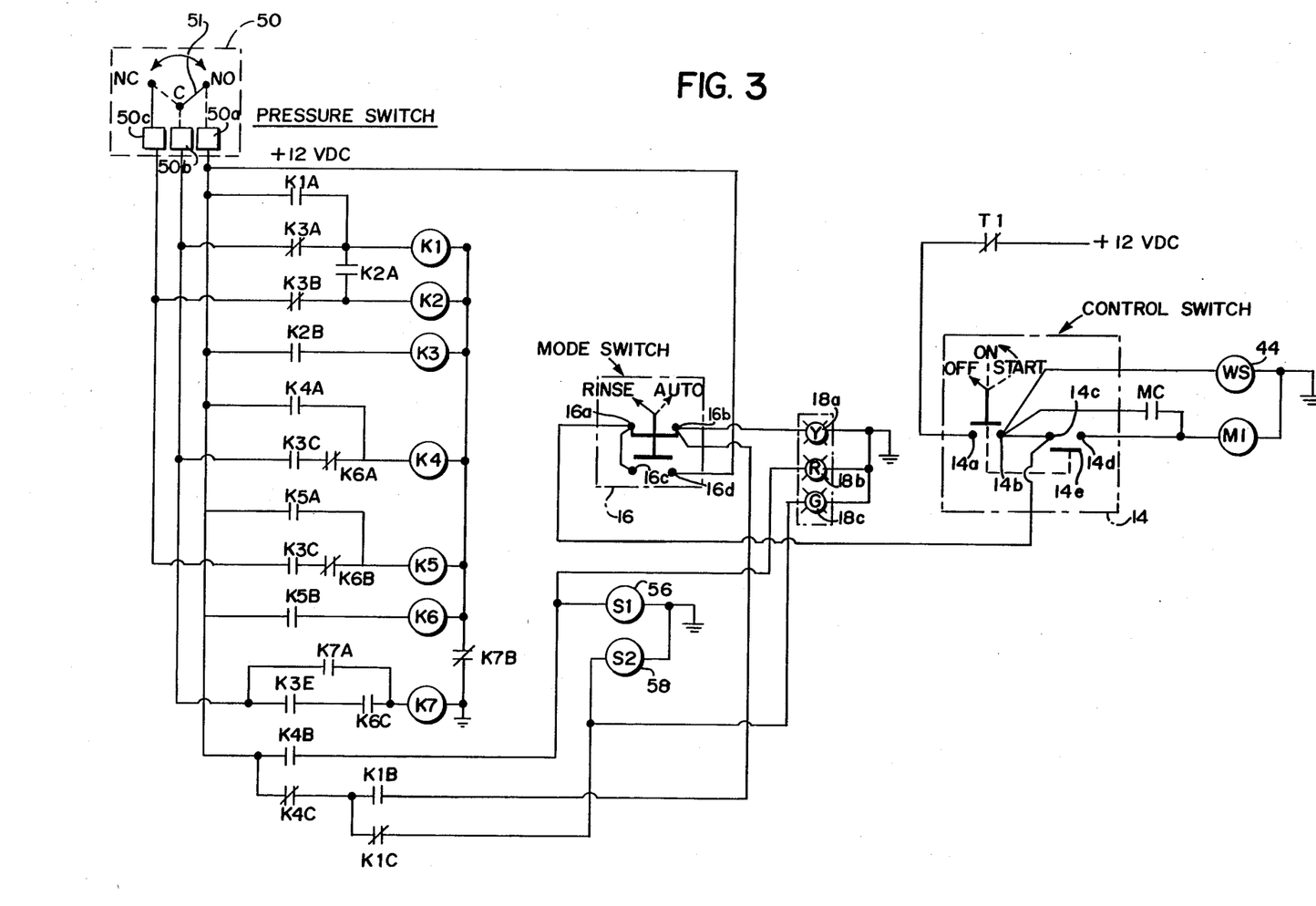
FIG. 3 is a schematic diagram of an exemplary electromagnetic relay-controlled sequencer controller in accordance with the present invention.

When it is desired to supply rinse water at this stage in the wash cycle to the wand 22, a user moves the control switch 14 from the "on" to the "start" position. This causes blade switch 14e to close contacts 14c and 14d thereby energizing the motor coil M1 which closes motor contactor MC thereby latching the motor coil M1 into an energized state. When the user releases the control switch 14, it will spring-return from the "start" to the "on" position but since the motor contactor MC is now closed, the motor coil M1 will be latched into the circuit thereby operating the motor 40, and hence the pump 42.

At this time the user may simply depress the trigger 30 of wand 22 so as to cause liquid to flow through the inlet conduit 45 and to the outlet (high-pressure) side of pump 42 so as to be discharged through nozzle 24 of wand 22. However, if the user does not depress trigger 30 of wand 22 so as to discharge liquid from nozzle 24, the liquid at the inlet side of pump 42 will begin to increase in temperature—i.e., sice pump 42 is of a positive displacement variety. Thus, if for a predetermined period of time (e.g., 30 minutes) the pump 42 is in operation without water being circulated to the wand 22, the temperature probe 52 will sense the resulting temperature increase and will open the temperature contact T1 at some preselected maximum temperature thereby shutting off power to the control switch 14 and disabling the motor coil M1 (and hence the motor 40).

With the mode switch 16 in the "RINSE" position, and with the control switch 14 having been moved to the "START" position, a user may then supply rinse water from the water supply to the vehicle 26 via wand 22. Water flowing through the inlet pipe 45 will cause the valve 49 to operate thereby, in turn, changing the blade switch 51 of microswitch 50 from its normally open contact NO (as shown in FIG. 3) to its normally closed contact NC. However, since no power is being supplied to the pressure switch 50 at this time (i.e., since the mode switch 16 is in its "RINSE" position), automatic sequencing control is not affected.

When the user desires to automatically cycle between the water supply and one or more sources of other liquid, he releases wand trigger 30 (thereby stopping the flow of liquid from the wand) and manually moves the mode switch 16 from its "RINSE" position to its "AUTO" position. Moving the mode switch 16 to the "AUTO" position opens contacts 16a, 16b and simultaneously closes contacts 16c, 16d so as to supply power to the normally open bus 50a of the pressure switch 50. An increased pressure condition within line 45 will thereby be sensed by means of valve 49, causing the valve to operate so as to change the state of microswitch 50 from its NC contact to its NO contact.

When the blade 51 for the pressure switch 50 has moved from its normally closed contact NC to its normally open contact NO, +12 Volt DC power will then be supplied via blade 51 through the normally open NO and common contact C of the pressure switch and through normally closed relay contact K3A so as to energize relay coil K1. Energization of coil K1 thereby, in turn, closes normally open relay contact K1A thus holding coil K1 in its energized state. Thus, power is now supplied to the common bus 50b of pressure switch 50 via closed contacts K1A and K3A (and power is supplied to "rinse" light 18a via normally closed contact K4C and normally open but now closed contact K1B). Contact K1C opens to prevent solenoid 58 from being energized.

In this mode (i.e., the mode switch 16 in the "AUTO" position and the coil K1 energized as indicated above), when a user squeezes the trigger 30 of wand 22, rinse water will be exhausted from nozzle 22. In addition, the blade 51 of pressure switch 50 will move from normally open contact NO to its normally closed contact NC.

When the user squeezes the trigger, user applied to the common bus 50b of the pressure switch is then supplied to the normally closed bus 50c thereof via the blade 51. This, in turn, supplies power to coil K2 via normally closed contact K3B, thereby energizing coil K2. Energization of coil K2 closes contact K2A thereby holding coil K2 in its energized state. Also, contact K2B closes when coil K2 energizes and, since constant +12 volt DC power is being supplied to the normally open bus 50a of pressure switch 50, coil K3 is energized which opens normally-closed contacts K3A and K3B. In this mode, rinse water (i.e., water not mixed with chemicals from sources "CHEM 1" or "CHEM 2") is being discharged from wand 22. It should be noted here that coils K1 and K2 remain energized due to the latch circuitry provided by contacts K1A and K2A, respectively. It should also be noted that when contacts K3A and K3B open with the energization of coil K3, the power supply to the common bus 50b of pressure switch 50 is terminated. However, since +12 volt DC power is being supplied to the normally open bus of switch 50 at all times when mode switch 16 is in the "AUTO" position, coils K1, K2 and K3 remain in their energized state (via closed contacts K1A, K2A and K2B, respectively). This condition places the control circuitry in a "stand-by" mode whereby the next sequencing of the trigger 30 will allow liquid from "CHEM 1" source 17 to be supplied to line 45 at junction 54.

Thus, when the user releases trigger 30 (thereby stopping the flow of rinse water being discharged from nozzle 24 of wand 22), the blade 51 of switch 50 will change from its normally closed contact NC to its normally open contact NO (i.e., in response to operation of valve 49 due to an increased pressure condition in line 45). This action of blade 51 thereby again supplies power to the common bus 50b of switch 50 and thus energizes coil K4 through contact K3C (closed upon the prior energization of coil K3) and normally closed contact K6A. Coil K4 is held in its energized state due to the closing of normally open contact K4A.

It will be noted here that contact K4B also closes when coil K4 is energized thereby energizing solenoid S1 of valve 56 to thus permit liquid from "CHEM 1" source 17 to flow to the junction 54 of the liquid circuit 36. At this time, contact K4C opens thereby extinguishing indicator light 18a (which had remained illuminated to this point in the control scheme via power supplied to contact 16b of switch 16 through contacts K4C and K1B, the latter closing upon energization of coil K1—i.e., simultaneously with switch 16 being moved to the "AUTO" position). However, since contact K4B is closed, the indicator light 18b is illuminated thereby giving the user visual indication that he/she is in the "CHEM 1" mode. Thus, when the user depresses trigger 30 of wand 22, liquid from the source 17 will be injected into the water at junction 54 and will be transferred to the spray wand 22 under pressure via pump 42.

It should also be noted that, at this time, the blade 51 for the pressure switch 50 changes, in response to the decreased pressure condition then existing in line 45 sensed by means of the valve 49, from its normally open contact NO to its normally closed contact NC. That is, a decreased pressure condition now exists in line 45, causing blade 51 to move in response. Power is therefore supplied to the normally closed bus 50c of switch 50 through contacts K6A and K3C so as to energize coil K5. Coil K5 is maintained in its energized state by the closure of contact K5A. Contact K5B also closes in response to energization of coil K5 and, since 30 12 volt DC power is being constantly supplied to the normally open bus 50a of switch 50, coil K6 is energized. Energization of coil K6, in turn, opens contact K6A and K6B but, since contacts K4A and K5A remain closed, coils K4 and K5 remain in their energized state. It should be noted that although contacts K3E and K6C are now closed (since coils K3 and K6 are respectively energized) coil K7 is not energized since no power is being supplied to the common bus 50b of switch 50 at this time. That is, contact K6A is opened (but coil K4 remains energized through contact K4A) and thus common bus 50b is not supplied with power. Thus, at this time, all coils K1 through K6 are in an energized state.

When the user again releases trigger 30 of wand 22, the blade 51 of pressure switch 50 will then change from its normally closed contact NC to its normally open contact NO (i.e., since an increased pressure condition now exists in supply line 45 due to the closure of wand 22). Power is therefore supplied through now closed contacts K3E and K6C so as to energize coil K7. Contact K7A is thus closed so as to hold coil K7 in an energized state. With the energization of coil K7, coils K1 through K6, inclusive, are de-energized due to the opening of contact K7B. This, in turn, causes contacts K1B and K1C to revert to their normally opened and normally closed conditions, respectively. Contact K4C also reverts to its normally closed condition as shown so that the solenoid coil S1 of valve 56 is de-energized and the indicator light 18b is extinguished. Simultaneously, however, solenoid coil S2 of valve 58 is energized and the indicator light 18c is illuminated (since contacts K4C and K1C are in their normally closed positions) thereby permitting liquid from "CHEM 2" source 19 to flow to junction 54 while terminating fluid communication between the line 45 and "CHEM 1" source 17. The illumination of indicator light 18C thus gives the user visual indication that he/she is now in the "CHEM 2" mode.

Thus, when the trigger 30 of wand 22 is again depressed so as to allow liquid to be discharged from nozzle 24, the valve 49 will again sense a decrease in pressure and thus blade 51 of microswitch 50 will move from its normally closed contact NC to its normally open contact NO. Since no power is now being supplied at this time to the coil K7 via the normally open bus 50a (i.e., since contact K7B has previously opened), coil K7 is de-energized. However, power is still being supplied to the solenoid S2 of valve 58 due to the normally closed contact K4C and K1C and the fact that power is constantly supplied to the normally open bus 50a of switch 50 when in the "AUTO" mode. Thus, even though coil K7 is de-energized, liquid from source 19 is still permitted to flow to junction 54 and mix with water in line 45 so that a mixture of the liquid in source 19 and water is supplied to the spray wand 22.

When the user again releases trigger 30 to thereby terminate the spray of liquid from nozzle 24, the valve 49 will again sense an increased pressure condition existing within line 45 and will, in turn, cause blade 51 of microswitch 50 to be responsively moved from its normally closed contact NC to its normally open contact NO. This movement therefore begins the cycle anew. That is, coil K1 is now energized via power supplied to the normally open contact through the common bus 51b and through normally closed contact K3A. Coil K1, as has been described, is then latched into the circuit via contact K1A which closes upon energization of coil K1. Hence, if the user again depresses the trigger 30 of wand 22, "rinse" water only from line 32 will be supplied through line 21—i.e., fluid communication between sources 17 and 19 will have been terminated as described above.

Of course, at any time during the wash sequence, if mode switch 26 is moved from the "AUTO" position to the "RINSE" position, power to the microswitch 50 is terminated. Thus, only during the "AUTO" mode is power supplied to microswitch 50 thereby permitting automatic selective sequencing of liquids.

As can be seen therefore, the present invention permits cyclic sequencing between rinse only, and between the liquid in sources 17 and 19 so that the user can selectively determine the particular liquid (or liquid mixture) to be applied to the vehicle 26 merely by manual operation of the trigger 30 of wand 22.

Figure 4:
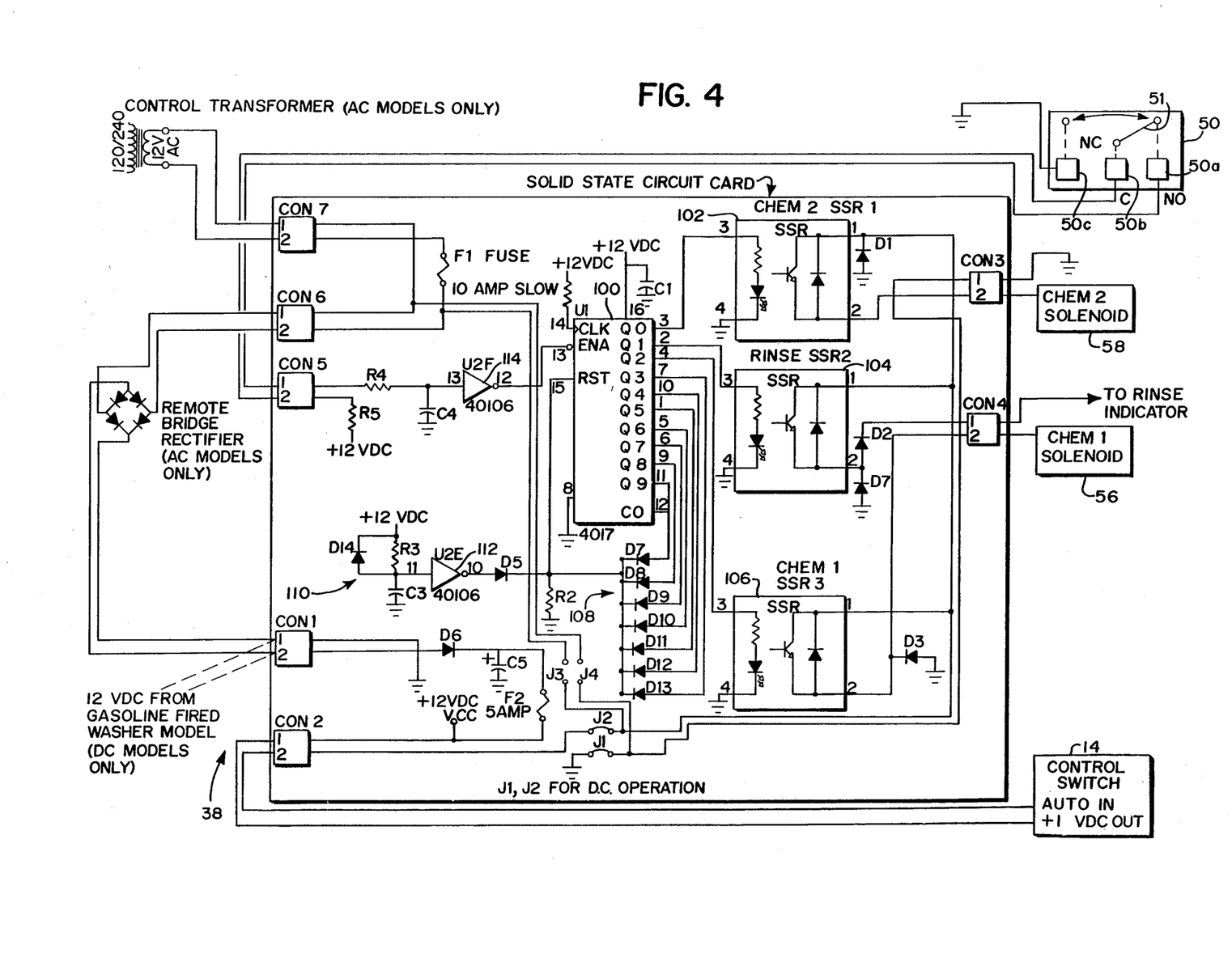
FIG. 4 is a schematic diagram of an exemplary solid state relay-controlled sequencer controller in accordance with the present invention.

FIG. 4 is a schematic diagram of a further presently preferred exemplary embodiment of electronic controller 38 in accordance with the present invention, this further embodiment using all solid state components for improved reliability and compactness. The heart of the FIG. 5 controller 38 is a CMOS decade counter/divider 100 (type 4017 in the preferred embodiment) which controls the current state of the system and sequences between states in response to sensed pressure increases via valve 49 and microswitch 50.

The Q0, Q1 and Q2 outputs of counter/divider 100 are used to control the on/off states of solid-state relays 102, 104, 106 respectively. Signals appearing on any other of the outputs of counter/divider 100 (i.e., outputs Q3–Q9 and the carry output CO) force the device to reset to its initial Q0 state via diode bank 108 and the reset input (RST). A conventional power-on reset-type circuit 110 including a resistor R3 and a capacitor C3 connected to the input of a Schmitt trigger 112 applies a power-on reset pulse to the RST input of counter/divider 100 when power is first applied to controller 38 so as to reset the counter/divider into its initial Q0 output state. Another Schmitt trigger circuit 114 provides a pulse of a duration controlled by the values of resistor R4 and capacitor C4 whenever microswitch blade 51 first contacts its normally open contact 50a in response to release of the wand trigger 30. Although counter/divider 100 is a synchronous device, its clocking input is tied to $V_{cc}$ and the counter/divider changes state asynchronously in response to pulses received on its ENA input from Schmitt trigger 114. In the preferred embodiment, control/divider 100 is actually operated in a shift register mode in which each one of its outputs Q0, Q1 and Q2 is active at a time. Each time counter/divider 100 receives an ENA pulse, it changes its state (e.g., by disabling its Q0 output and enabling its Q1 output; by disabling its Q1 output and enabling its Q2 output; by disabling its Q2 output and enabling its Q3 output; etc.) as those skilled in the art are well aware from commonly-available data sheets describing the type 4017 CMOS decade counter/divider.

The operation of the electronic controller 38 shown in FIG. 5 will now be described.

When DC voltage is first applied to connector CON 1 (either from a 12 vdc source or from a conventional line voltage step-down transformer and associated bridge rectifier or the like), capacitor C5 provides filtered 12 VDC voltage through 5 amp fuse F2 to various points in controller 38, including:

(a) CLK and power inputs of counter/divider 100;
(b) the common (c) terminal 50B of microswitch 50;
(c) the "line" side of control switch 14 via connector CON 2, terminal 2, (and also to the pump station 36 as described previously via temperature sensor contacts T1 also as described previously);
(d) the input of Schmitt trigger 112.

In response to this initial application of power, Schmitt trigger 112 fires and pulses the RST input of counter/divider 100 through diode D5. This outputted pulse causes counter/divider 100 to reset so that output Q0 is high and all other outputs are low. Input voltage to Schmitt trigger 112 decays as capacitor C3 charges so that the output of the Schmitt trigger remains high only for a short period of time sufficient to ensure the counter/divider 100 is reset.

With mode switch 16 in the "auto" position (as previously described), when the control switch 14 is turned to the "start" position (see FIG. 3) the pump motor M1 is energized (thereby pressuring the system). The resulting pressure at valve 49 causes the microswitch blade 51 to contact normally open contact 50a—thereby applying 12 VDC to contact 50a and thus to the input of Schmitt trigger 114 via R4 and C4. Schmitt trigger 114 applies a pulse to the ENA ("enable") input of counter/divider 100, causing the counter/divider to disable its Q0 output and to enable its Q1 output. The now-active Q1 output energizes the "rinse" solid state relay 104, and causes the "rinse" indicator 18a to be illuminated through mode switch 16, connector CON 2, terminal 1; jumper J2; the internal triac of rinse relay 104; and connector CON 4, terminal 1. The duration of the pulse provided by Schmitt trigger 114 is relatively short since the input voltage to the Schmitt trigger decays as capacitor C4 charges.

Depressing wand trigger 30 allows rinse water to flow from nozzle 24. The resulting vacuum created at valve 49 causes microswitch blade 51 to return to normally closed contact 50c, disconnecting power from the input of Schmitt trigger 114 and allowing capacitor C4 to discharge (if desired, in part through grounded normally closed contact 50c).

When the user again releases wand trigger 30, microswitch blade 51 returns to normally open contact 50a—causing Schmitt trigger 114 to provide another pulse to the counter/divider 100 ENA input. In response to this pulse, counter/divider 100 disables its active Q1 output and enables its Q2 output. The Q2 output is connected to energized the "CHEM 1" solid state relay 106, in turn energizing the "CHEM 1" solenoid 56 (via connector CON 4, terminal 2). Indicator 18b also illuminates as describes previously. Depressing wand trigger 30 allows water and chemical 1 to flow from nozzle 24, and also controls microswitch blade 51 to return to the normally closed 50c (thereby facilitating discharge of capacitor C4).

When wand trigger 30 is again released, microswitch blade 51 again returns to the normally open contact 50a to provide yet another pulse from the output of Schmitt trigger 114. In response to this further pulse, counter/divider 100 disables its Q2 output and enables its Q3 output. Since counter/divider output Q3 is tied back to the RST input of the counter/divider via diode D13, the counter/divider resets to disable its Q3 output and enable its Q0 output. Output Q0 energizes solid state relay 102 to in turn energize the "CHEM 2" solenoid 58 and associated indicator lamp 18c. When the user next depresses wand trigger 30, microswitch blade 51 moves to the normally closed contact 50c to facilitate discharge of capacitor C4 in preparation for the next release of the wand trigger. When wand trigger 30 is next released, microswitch blade 51 once again connects to normally open contact 50a so that a pulse is provided from Schmitt trigger 112 to disable the Q0 output of counter/divider 100 and to enable output Q1. The active output Q1 energizes rinse solid state 104 to provide a "rinse" visual indication (thus beginning the cycle all over again).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A motor vehicle washing system comprising:
   a primary source of liquid and a secondary source of liquid intended to be mixed with liquid from said primary source;
   a manually actuable fluid applicator having: an operative condition wherein liquid is allowed to be discharged therefrom, and an inoperative condition, wherein liquid is prevented from being discharged therefrom;
   supply means which fluid-connect said primary and secondary liquid sources one to another and to the liquid applicator for supplying said liquids therefrom to the liquid applicator; and
   sequencing control means in operative association with said supply means for (i) sensing a predetermined liquid pressure condition within said supply means, and (ii) switching automatically between a primary liquid supplied to said supply means solely from said primary liquid source and a mixture of liquids from both said primary and said secondary sources to be supplied to said supply means in response to said sensed pressure condition, whereby sequencing between said primary liquid and said liquid mixture is selectively controlled, and wherein said sequencing control means includes:
   (a) solenoid valve means associated with said secondary liquid source, said valve means having a first state wherein no fluid communication exists between said secondary source and said supply means, said valve means having a second state wherein fluid communication is present between said secondary source and said supply means so as to allow liquid from said secondary source to mix with said primary liquid from said primary source thereby forming said liquid mixture;
   (b) pressure sensing means in operative association with said supply means for sensing first and second pressure conditions within said supply means;
   (c) switch means operatively connected to said pressure sensing means and being movable between first and second positions in response to said sensed first and second pressure conditions within said supply means;
   (d) first, second and third relay means each having energized and deenergized states operatively connected to said switch means;
   (e) latching circuit means which operatively interconnects said first, second and third relay means to said switch means, for sequentially (1) causing said first relay means to assume said energized state thereof while maintaining said second and third relay means in said deenergized states thereof when said switch means is initially in said first position, (2) maintaining said first relay in said energized state thereof during and after movement of said switch means from said initial first position to said second position, (3) causing said second relay means to assume its said energized state while maintaining at least said third relay means in said deenergized state thereof when said switch means is in said second position thereof, (4) causing said solenoid valve means to assume its said second state in response to energization of said second relay means, whereby said liquid mixture is formed, (5) maintaining said second relay means in said energized state when said switch means reverts from said second position to said first position thereof, (6) energizing said third relay means in response to said switch means reverting to said first position, and (7) causing said first and second relay means to each assume said deenergized states thereof in response to said third relay means being in said energized state.

2. A motor vehicle washing system as in claim 1, wherein said supply means includes a pump for supplying liquid under pressure to said liquid applicator.

3. A motor vehicle washing system as in claim 1, further comprising manually selectable mode switch means for selectively disabling said control means so that only liquid from said primary liquid source is permitted to be supplied to said liquid applicator, and for selectively enabling said control means when sequencing of liquid from said primary and secondary liquid sources is desired.

4. A system which applies liquid onto an object comprising:
   a manually actuable spray wand;
   first and second sources of liquid;
   conduit means for fluid connecting said spray wand with said first and second liquid sources; and
   means for allowing selective sequencing of liquid application from said first and second liquid sources, said sequencing means including,
   (i) pressure sensing means for sensing a predetermined pressure condition within said conduit means;
   (ii) valve means for respectively opening and closing fluid communication between said wand and said first and second liquid sources so that liquid from one of said first and second liquid sources flows through said wand and is applied to the object when said wand is manually actuated; and
   (iii) control means operatively interconnecting said pressure sensing means and said valve means and being responsive to said sensed predetermined pressure condition for activating said valve means to thereby selectively control liquid application onto said object from said first and second sources, said control means including;
   (a) switch means operatively connected to said pressure sensing means and being movable between first and second positions in response to said sensed pressure condition within said supply means;
   (b) first, second and third relay means each having energized and deenergized states operatively connected to said switch means; and
   (c) latching circuit means which operatively interconnects said first, second and third relay means to said switch means, for sequentially (1) causing said first relay means to assume said energized state thereof so as to cause said valve means to open communicatin between said first liquid source and close communication between said wand and said second liquid source, while maintaining said second and third relay means in said deenergized states thereof when said switch means is initially in said first position, (2) maintaining said first relay in said energized state thereof during and after movement of said switch means from said intial first position to said second position, (3) causing said second relay means to assume its said energized state while maintaining at least said third relay means in said deenergized state thereof when said switch means is in said second position thereof, (4) causing said valve means to open fluid communication between said wand and said second liquid source and thus close communication between said wand and said first liquid source in response to energization of said second relay means, (5) maintaining said second relay means in said energized state when said switch means reverts from said second position to said first position thereof, (6) energizing said third relay means in response to said switch means reverting to said first position, and (7) causing said first and second relay means to each assume said deenergized states thereof in response to said third relay means being in said energized state.

5. A system as in claim 4, wherein said spray wand includes a manually actuated trigger to permit said liquid to be expressed therefrom when said trigger is depressed and to prevent liquid from being expressed therefrom when said trigger is released.

6. A system as in claim 5, wherein said predetermined pressure condition is created in said conduit means when said trigger is released.

7. A system as in claim 4, further comprising pump means for delivering liquid from said one and other liquid sources to said wand under pressure.

8. A system as in claim 4, wherein said conduit means includes first and second liquid supply paths for respectively fluid connecting said first and second liquid sources to said wand, and wherein said valve means includes first and second valves disposed in said first and second liquid supply paths, respectively, each of said first and second valves being responsive to said sensed pressure condition so as to sequentially cyclically open and close fluid communication between said wand and said one and other liquid sources in response to cyclical depression and release of said wand trigger.

9. A vehicular washing system comprising:
   a wand including a nozzle and a manually actuable valve in fluid coupling with said nozzle, said valve alternately inhibiting and permitting the flow of fluid from said nozzle;
   a pressurized fluid source coupled to said wand;
   pressure sensing means coupled to said fluid source for detecting an increase in pressure responsive to said valve inhibiting said fluid flow and for producing a first pulsed signal in response to said detected pressure increase;
   state register means connected to receive said first pulsed signal for sequencing between first and second mutually exclusive states in response to receipt of said first pulsed signal, said state register means producing an output signal Q2 when in said second state and inhibiting producing said output signal Q2 when in said first state;
   solid state relay means connected to receive said Q2 output signal for producing a solenoid driving signal in response to receipt of said Q2 signal;
   a source of fluid additive; and solenoid means, connected between said fluid additive source and said wand and connected to receive said solenoid driving signal, for permitting said fluid additive to mix with said pressurized fluid in response to said solenoid driving signal.

10. A vehicular washing system as in claim 9 wherein said state register means comprises a counter/divider having an enable signal, said counter/divider operating in a shift mode in response to receipt of said pulsed signal.

11. A vehicular washing system as in claim 9 wherein said pressure sensing means comprises:
 a further valve in fluid communication with said pressurized fluid source, said valve including a diaphragm which moves in response to an increase in pressure of said pressurized fluid; and
 microswitch means mechanically connected to said diaphragm, said microswitch means for producing an electrical signal each time said diaphragm moves in response to said pressure increase; and
 means for converting said electrical signal to a pulsed signal.

12. A vehicular Washing system as in claim 11 wherein said converting means comprises:
 RC network means for conditioning said electrical signal; and
 Schmitt trigger means connected to receive said conditioned signal for producing said first pulsed signal.

13. A vehicular washing system as in claim 9 wherein said state register means includes means for automatically resetting to said first state when said pulsed signal is received and said state register means is sequenced into said second state.

14. A vehicular washing system as in claim 13 wherein said register means comprises a synchronous sequential state circuit having a synchronizing clock input CLK and an asynchronous input, said pulsed signal being applied to said asynchronous input, said clock input being connected to a constant signal level.

* * * * *